United States Patent
Tan-Kim et al.

(10) Patent No.: US 11,698,029 B2
(45) Date of Patent: Jul. 11, 2023

(54) DUAL-FLOW TURBOJET ENGINE ARRANGEMENT WITH EPICYCLIC OR PLANETARY REDUCTION GEAR

(71) Applicant: SAFRAN AIRCRAFT ENGINES, Paris (FR)

(72) Inventors: Alexandre Jean-Marie Tan-Kim, Moissy-Cramayel (FR); Yanis Benslama, Moissy-Cramayel (FR); Jérémy Dievart, Moissy-Cramayel (FR); Julien Fabien Patrick Becoulet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 29 days.

(21) Appl. No.: 17/294,543

(22) PCT Filed: Nov. 21, 2019

(86) PCT No.: PCT/FR2019/052774
§ 371 (c)(1),
(2) Date: May 17, 2021

(87) PCT Pub. No.: WO2020/109702
PCT Pub. Date: Jun. 4, 2020

(65) Prior Publication Data
US 2022/0025821 A1    Jan. 27, 2022

(30) Foreign Application Priority Data
Nov. 27, 2018  (FR) ...................................... 18 71931

(51) Int. Cl.
*F02C 7/36* (2006.01)
*F02C 7/06* (2006.01)

(52) U.S. Cl.
CPC .................. *F02C 7/36* (2013.01); *F02C 7/06* (2013.01); *F05D 2240/50* (2013.01); *F05D 2240/60* (2013.01); *F05D 2260/40311* (2013.01)

(58) Field of Classification Search
CPC .......... F02C 7/36; F02C 7/06; F05D 2240/50; F05D 2240/60; F05D 2260/40311
(Continued)

(56) References Cited

U.S. PATENT DOCUMENTS 3,673,802 A  *  7/1972  Krebs ..................... F02C 3/067
                                                      60/268
2010/0154384 A1* 6/2010  Schilling .................. F01D 5/03
                                                      60/268
(Continued)

FOREIGN PATENT DOCUMENTS

EP         2 199 568 A2    6/2010

OTHER PUBLICATIONS

International Search Report dated Mar. 12, 2020 in PCT/FR2019/052774 filed Nov. 21, 2019, 2 pages.
(Continued)

*Primary Examiner* — Yi-Kai Wang
(74) *Attorney, Agent, or Firm* — Oblon, McClelland, Maier & Neustadt, L.L.P.

(57) ABSTRACT

A dual-flow turbojet engine having a central shaft surrounded by a high-pressure body which rotate about the same longitudinal axis while being independent in rotation, and including a fan driven by the central pressure shaft; a high-pressure compressor and a high-pressure turbine mounted on the high-pressure body; an inter-turbine casing; a low-pressure turbine mounted on a low-pressure rotor surrounding the central shaft; an exhaust casing on which an output cone is mounted; a reduction gear with which the
(Continued)

low-pressure rotor drives the central pressure shaft; two bearings mounted on the exhaust casing and respectively receiving the central shaft and the low-pressure rotor; a bearing mounted on the inter-turbine casing and receiving the low-pressure rotor.

10 Claims, 4 Drawing Sheets

(58) Field of Classification Search
USPC .......................................................... 415/122
See application file for complete search history.

(56) References Cited

U.S. PATENT DOCUMENTS

| | | |
|---|---|---|
| 2013/0287575 A1 | 10/2013 | McCune et al. |
| 2013/0336791 A1 | 12/2013 | McCune et al. |
| 2014/0234079 A1 | 8/2014 | McCune et al. |
| 2017/0159572 A1 | 6/2017 | McCune et al. |
| 2017/0218789 A1 | 8/2017 | McCune et al. |
| 2017/0218849 A1 | 8/2017 | McCune et al. |
| 2017/0218850 A1 | 8/2017 | McCune et al. |
| 2017/0226935 A1 | 8/2017 | McCune et al. |
| 2017/0027601 A1 | 9/2017 | McCune et al. |
| 2017/0276009 A1 | 9/2017 | McCune et al. |
| 2017/0298757 A1 | 10/2017 | McCune et al. |
| 2017/0306855 A1 | 10/2017 | McCune et al. |
| 2018/0094532 A1 | 4/2018 | McCune et al. |
| 2018/0119563 A1 | 5/2018 | McCune et al. |
| 2018/0119564 A1 | 5/2018 | McCune et al. |
| 2018/0135454 A1 | 5/2018 | McCune et al. |
| 2018/0149036 A1 | 5/2018 | McCune et al. |

OTHER PUBLICATIONS

Preliminary French Search report dated Jul. 12, 2019 in French Patent Application No. 1871931 filed Nov. 27, 2018, 2 pages (with Translation of Category).

* cited by examiner

DUAL-FLOW TURBOJET ENGINE ARRANGEMENT WITH EPICYCLIC OR PLANETARY REDUCTION GEAR

TECHNICAL FIELD

The invention relates to a twin-spool turbojet engine arrangement integrating an epicyclic or planetary reduction gear.

PRIOR ART

In such an engine 1 represented in FIG. 1, air is drawn into an inlet duct 2 to pass through a fan 3 including a series of rotating blades before being split into a central primary flow and a secondary flow surrounding the primary flow.

Afterwards, the primary flow is compressed in compression stages 4 and 6 before reaching a combustion chamber 7, after which it expands through a high-pressure turbine 8 and a low-pressure turbine 9 before being discharged rearwards. In turn, the secondary flow is propelled directly rearwards by the fan within a flow path delimited by the casing 11.

Such a twin-spool type engine includes a so-called low-pressure spool by which the fan 3 is coupled to the low-pressure turbine, and a so-called high-pressure spool by which the compressor is coupled to the high-pressure turbine, these two spools being coaxial and rotatably independent of each other.

Thanks to a reduction gear interposed between the low-pressure turbine and the fan, the low-pressure turbine rotates faster than the fan driven thereby, in order to increase efficiency. In this configuration, the low-pressure spool includes a central shaft for driving the fan and a rotor carrying the low-pressure turbine while being connected to the central shaft through the reduction gear.

The high-pressure and low-pressure spools are held by journals carried by structural elements of the engine. In practice, the low-pressure spool is a critical element of the arrangement, because its central shaft extends substantially over the entire length of the engine, so that during operation, that is to say when it rotates, it may be subject to vibration modes that could lead to the destruction of the engine. In particular, because of its considerable length, the first flexural vibration mode of the central shaft lies within its operating range, that is to say within the range of frequencies corresponding to its rotational frequencies.

This situation requires carrying out a high-speed balancing of the central shaft, but also providing for journals that are capable of damping its vibration modes to limit possible imbalances. Such journals, generally referred to by the acronym SFD meaning "squeeze film dampers" include a fixed soft cage carrying a bearing receiving the low-pressure spool, and around which a hydraulic pressure is maintained, this journal type being expensive to implement.

The invention aims to provide arrangement solutions allowing improving holding of the low-pressure rotating elements to limit resort to complex journals for damping vibration modes.

DISCLOSURE OF THE INVENTION

To this end, an object of the invention is a dual-flow turbojet engine including a central shaft surrounded by a high-pressure spool, coaxial and rotatably independent, this turbojet engine including from upstream to downstream according to the direction of circulation of the flow that passes therethrough when it is operating:
   a fan driven by the central shaft;
   a high-pressure compressor and a high-pressure turbine belonging to the high-pressure spool;
   an inter-turbine casing;
   a low-pressure turbine;
   an exhaust casing;
   this turbojet engine further including:
   a low-pressure rotor which surrounds the central shaft and which comprises the low-pressure turbine;
   a rotor upstream journal carried by the inter-turbine casing and which rotatably guides the low-pressure rotor while being located downstream of the high-pressure compressor;
   a rotor downstream journal carried by the exhaust casing, and which rotatably guides the low-pressure rotor;
   a reduction gear through which the low-pressure rotor drives the central shaft, this reduction gear being located downstream of the rotor downstream journal;
   a shaft downstream journal which rotatably guides the central shaft while being located downstream of the rotor downstream journal.

With this arrangement, the speed of the central shaft is reduced and its length is enlarged thanks to the shaft journal located downstream, which helps reducing the frequencies of its normal modes to bring them away from the rotational frequencies. The reduction of this speed also allows enlarging the fan diameter without the tip speed of the blades of this fan becoming excessive.

The invention also relates to a turbojet engine as defined, wherein the shaft downstream journal is carried by the exhaust casing while being located downstream of the reduction gear.

The invention also relates to a turbojet engine as defined, comprising a low-pressure middle journal carried by the inter-turbine casing and rotatably guiding the central shaft.

The invention also relates to a turbojet engine as defined, comprising an outlet cone carried by the exhaust casing, and wherein the shaft downstream journal is located in an inner space of the outlet cone.

The invention also relates to a turbojet engine as defined, wherein the reduction gear is located inside the inner space.

The invention also relates to a turbojet engine as defined, wherein the low-pressure rotor is equipped with a radially-flexible element located between the rotor downstream journal and the reduction gear.

The invention also relates to a turbojet engine as defined, including a low-pressure compressor driven by the central shaft while being located between the fan and the high-pressure compressor.

The invention also relates to a turbojet engine as defined, wherein the reduction gear is an epicyclic reduction gear comprising:
   planets carried by a planet carrier which is carried by the central shaft;
   an inner crown which is carried by the low-pressure rotor;
   an outer crown which is carried by the exhaust casing;
   each planet meshing with the inner crown and the outer crown.

The invention also relates to a turbojet engine as defined, wherein the reduction gear is a planetary reduction gear comprising:
   planets carried by a planet carrier which is carried by the exhaust casing;
   an inner crown which is carried by the low-pressure rotor;
   an outer crown which is carried by the central shaft;

each planet meshing with the inner crown and the outer crown.

DETAILED DISCLOSURE OF PARTICULAR EMBODIMENTS

Figure 1:
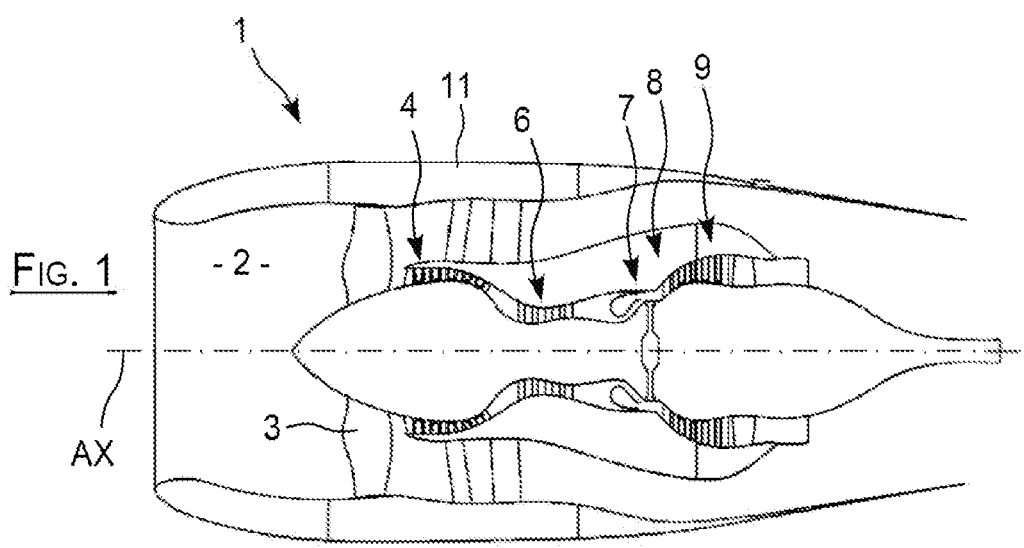
FIG. 1 is a longitudinal sectional view of a known dual-flow twin-spool turbojet engine.
Figure 2:
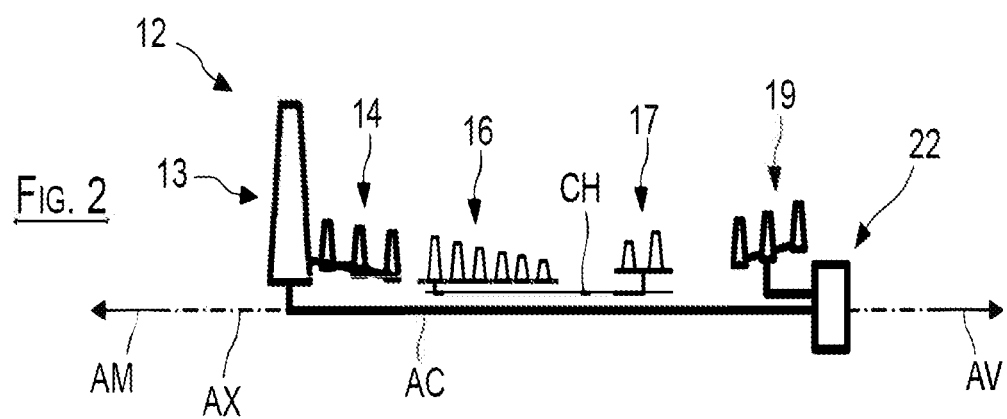
FIG. 2 is a schematic longitudinal sectional view of a turbojet engine architecture according to the invention.

As schematically represented in FIG. 2, the engine according to the invention features an architecture comprising a fan 13 at its upstream portion AM followed by a low-pressure compressor 14. The fan and the low-pressure compressor are driven in rotation by a central shaft AC extending over most of the length of the engine, the fan being crossed by the entirety of the flow coming inside this engine.

The upstream AM and downstream AV directions are defined with respect to the direction of circulation of the flow in the engine along its longitudinal axis AX, in accordance with usual conventions.

A high-pressure compressor 16 located immediately downstream AV of the compressor 14 compresses the fluid of the primary flow having passed through the low-pressure compressor, before getting in a non-represented combustion chamber located immediately downstream of this high-pressure compressor 16.

After passage in the combustion chamber, the fluid expands through a high-pressure turbine 17 which drives the compressor 16. The blades of the high-pressure compressor 16 and of the high-pressure turbine 17 are carried by the same high-pressure spool CH or are integrally made with the latter. This high-pressure spool CH extends in the central region of the engine along the axis AX, it surrounds the central shaft AC while being fully rotatably independent thereof.

Figure 3:
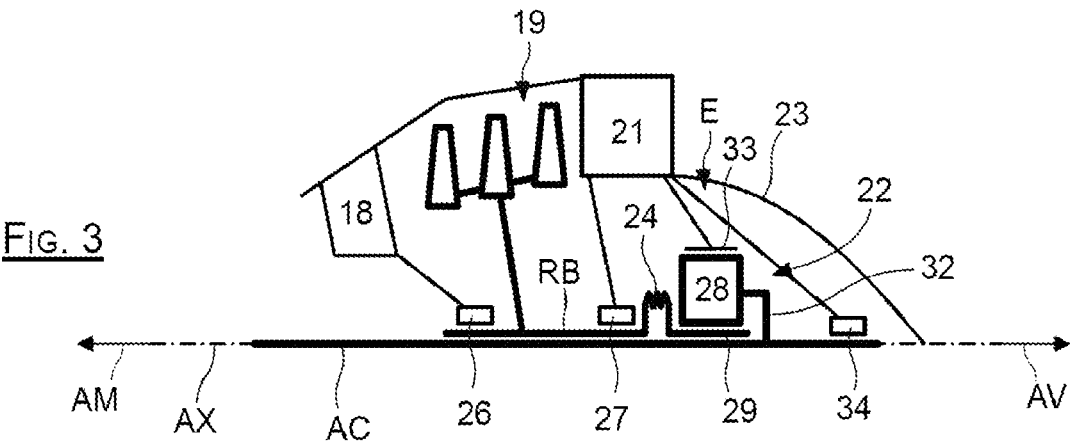
FIG. 3 is a schematic longitudinal sectional view of a downstream portion of a turbojet engine architecture according to a first embodiment of the invention.

After having passed through the high-pressure turbine 17, the fluid transits in an inter-turbine casing bearing the reference numeral 18 in FIG. 3, before passing through a low-pressure turbine 19, and is then discharged through an exhaust casing 21.

The inter-turbine casing 18 includes concentric outer shroud and inner shroud delimiting therebetween an annular space for the passage of the primary flow, as well as a set of fixed radial blades each linking the outer shroud to the inner shroud and allowing de-twisting the primary flow. Similarly, the exhaust casing 21 includes concentric outer shroud and inner shroud delimiting an annular space for the passage of the expanded primary flow, as well as a set of fixed radial arms each linking these two shrouds to each other.

The low-pressure turbine 19 is rotatably linked to the central shaft by an epicyclic reduction gear 22 located downstream AV, and thanks to which it rotates faster than the fan 13, in order to improve the efficiency of the engine.

As shown more clearly in FIG. 3, the exhaust casing 21 carries an outlet cone 23 which closes the downstream region of the engine located radially inward of the primary flow path, this outlet cone 23 extending downstream.

The reduction gear 22 is located inside an inner space E delimited by the exhaust casing 21 and by the outlet cone 23 extending this casing 21, while being connected to the central shaft AC and to a rotor RB carrying the low-pressure turbine.

This rotor RB which surrounds the central shaft AC extends from a middle portion by which it carries the disks or blades of the low-pressure turbine, up to a downstream portion by which it is coupled to the reduction gear. This rotor RB includes in its central region a radially-flexible element 24.

This flexible element 24 is soft according to the radial direction to enable off-centring of the upstream portion of the rotor RB with respect to its downstream portion while ensuring a torque transmission from one portion to another.

As shown in FIG. 3, the low-pressure rotor RB is held and rotatably guided by an upstream journal 26 located upstream of the low-pressure turbine 19 and by a downstream journal 27 located between this low-pressure turbine 19 and the radially-flexible element 24. The rotor upstream journal 26 is carried by the inter-turbine casing 18, and the rotor downstream journal 27 is carried by the exhaust casing 21. At least one of the two rotor journals 26 and 27 is a thrust journal, that is to say taking up the axial thrust force generated by the low-pressure turbine to transfer it to the structure of the engine.

This reduction gear includes planet pinions 28 surrounding an inner crown 29, also called sun wheel, and surrounded by an outer crown 33 each meshing with these two crowns, these pinions 28 being carried by a planet carrier 32.

In the case of FIG. 3, the reduction gear, which bears the reference numeral 22, is of the epicyclic type, that is to say the planet carrier 32 is rotatably movable while being rigidly secured to the central shaft AC. In turn, the inner crown 29 is rigidly secured to the low-pressure rotor RB whereas the outer crown 33 is rigidly secured to the exhaust casing 21 while being carried by the latter.

The central shaft AC is carried and rotatably guided by an upstream journal that is not shown in FIG. 3 and located at the upstream portion of the engine, and by a central shaft downstream journal 34 which is located downstream of the reduction gear 22, while being carried by the exhaust casing 21. As shown in the figures, the downstream journal 34 is located in an inner space E of the outlet cone 23.

Figure 4:
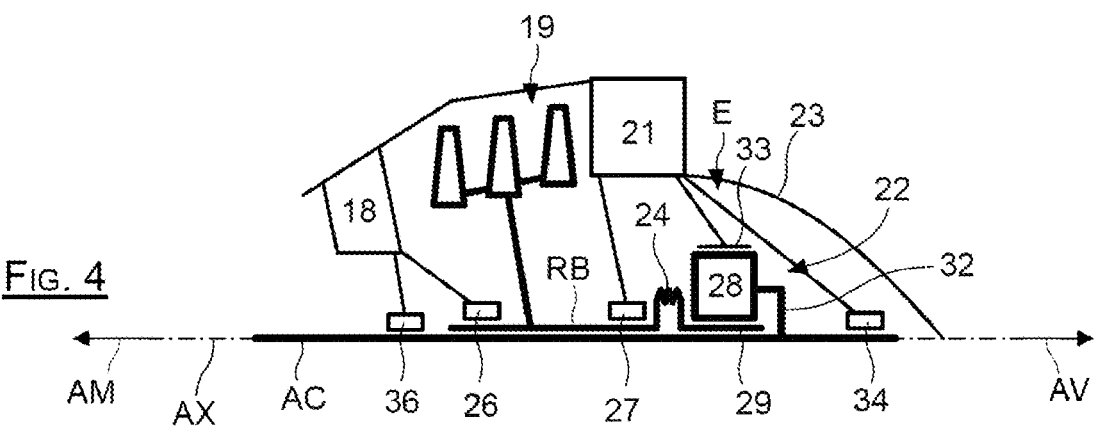
FIG. 4 is a schematic longitudinal sectional view of a downstream portion of a turbojet engine architecture according to a second embodiment of the invention.

Holding of the central shaft AC may be improved by providing for a low-pressure middle journal 36, as represented in FIG. 4, this middle journal being carried by the inter-turbine casing 18 and receiving the central shaft AC to support its middle region. The addition of this middle journal 36 allows enhancing holding of the central shaft AC so as to further reduce the frequencies of its vibration modes.

Figure 5:
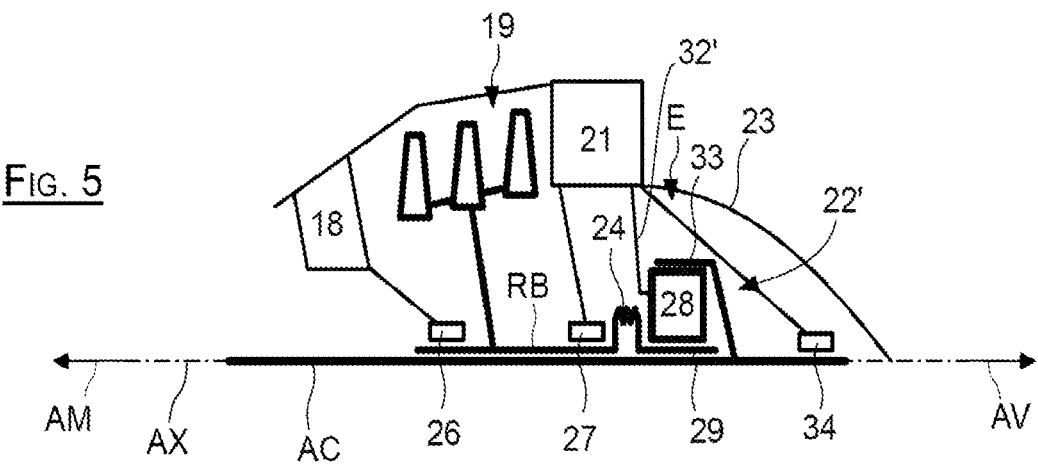
FIG. 5 is a schematic longitudinal sectional view of a downstream portion of a turbojet engine architecture according to a third embodiment of the invention.
Figure 6:
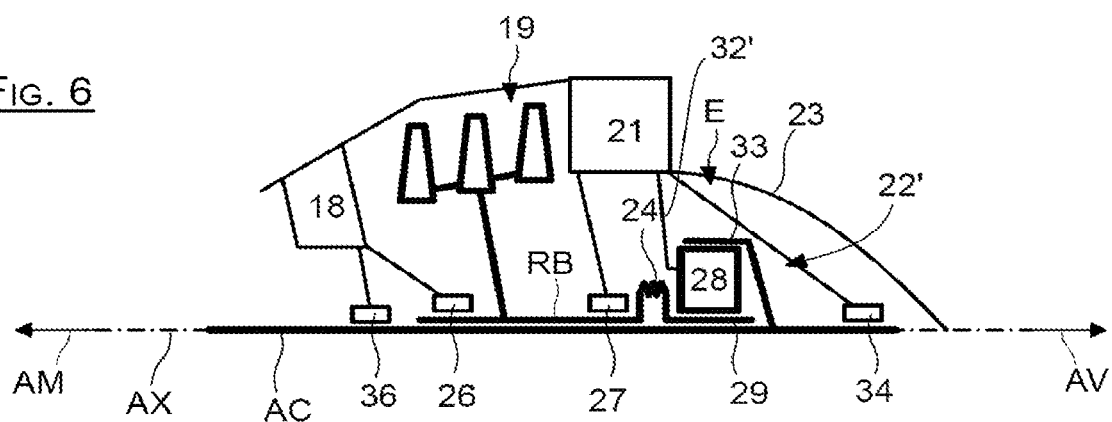
FIG. 6 is a schematic longitudinal sectional view of a downstream portion of a turbojet engine architecture according to a fourth embodiment of the invention.

The examples of FIGS. 5 and 6 show embodiments having, respectively, the same architectures as in FIGS. 3 and 4, but wherein the reduction gear, bearing the reference numeral 22', is a planetary, rather than epicyclic, reduction gear.

This planetary reduction gear 22' also includes planet pinions 28 surrounding an inner crown 29 and surrounded by an outer crown 33 while each of them meshes with these two crowns, these pinions 28 being carried by a planet carrier 32'.

The planet carrier, bearing the reference numeral 32', is fixed while being carried by the exhaust casing 21, and the outer crown 33 is movable while being rigidly secured to the central shaft AC. In turn, the inner crown 29 is carried by the low-pressure rotor RB, like in the embodiments of FIGS. 3 and 4.

Thus, in the example of FIG. 5, the central shaft is held by an upstream journal that is not shown and by the downstream journal 34, and in the example of FIG. 6, this shaft AC is held by the downstream journal 34 and also by a low-pressure middle journal, these two journals having the same arrangement as in the already described examples of FIGS. 3 and 4.

Figure 7:
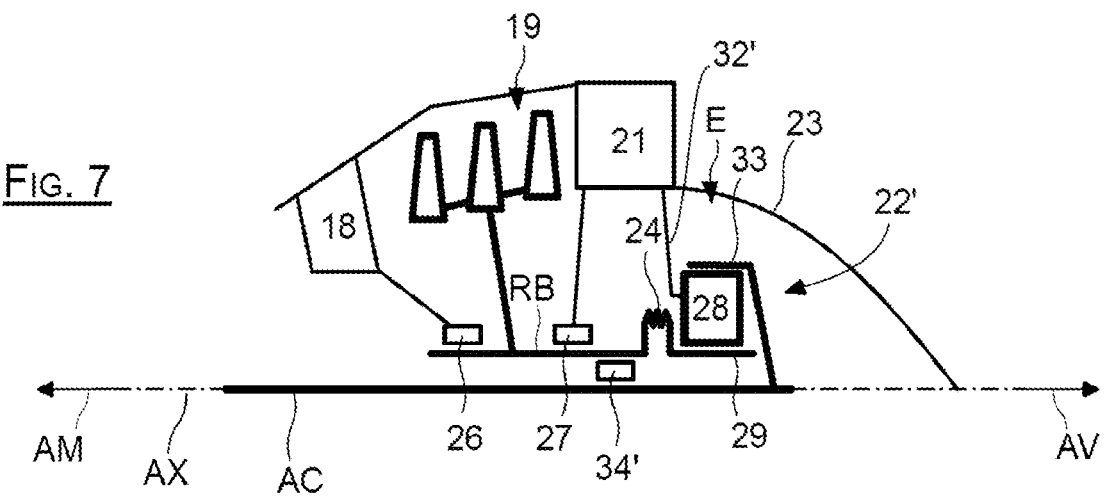
FIG. 7 is a schematic longitudinal sectional view of a downstream portion of a turbojet engine architecture according to a fifth embodiment of the invention.

In the embodiments of FIGS. 2 to 6, the central shaft downstream journal 34 is a fixed journal carried by the exhaust casing 21 while being located downstream of the reduction gear 22 or 22'. Complementarily, or alternatively as represented in FIG. 7, the shaft downstream journal, bearing the reference numeral 34', may be an inter-shaft journal, which surrounds the shaft AC to hold it and rotatably guide it, while being surrounded by the rotor RB, and while being located downstream of the downstream rotor journal 27. In this configuration, the downstream portion of the central shaft AC is thus held via the low-pressure rotor RB, and not directly by the exhaust casing 21.

The invention allows getting rid of the additional journals usually provided to support the central shaft in order to bring the natural frequencies of this shaft off its rotational frequencies. Thus, it allows limiting the implementation of complex journals such as SFD journals, and reducing the balance accuracy required for the central shaft.

The invention claimed is:

1. A dual-flow turbojet engine comprising a central shaft surrounded by a high-pressure spool, coaxial and rotatably independent, said turbojet engine including from upstream to downstream according to the direction of circulation of flow that passes therethrough when said turbojet engine is operating:
   a fan driven by the central shaft;
   a high-pressure compressor and a high-pressure turbine belonging to the high-pressure spool;
   an inter-turbine casing;
   a low-pressure turbine;
   an exhaust casing;
   said turbojet engine further including:
      a low-pressure rotor which surrounds the central shaft and which comprises the low-pressure turbine;
      a rotor upstream journal carried by the inter-turbine casing and which rotatably guides the low-pressure rotor while being located downstream of the high-pressure compressor;
      a rotor downstream journal carried by the exhaust casing, and which rotatably guides the low-pressure rotor;
      a reduction gear through which the low-pressure rotor drives the central shaft, said reduction gear being located downstream of the rotor downstream journal;
      a shaft downstream journal which rotatably guides the central shaft while being located downstream of the rotor downstream journal.

2. The turbojet engine according to claim 1, wherein the shaft downstream journal is carried by the exhaust casing while being located downstream of the reduction gear.

3. The turbojet engine according to claim 1, comprising a low-pressure middle journal carried by the inter-turbine casing and receiving the central shaft.

4. The turbojet engine according to claim 1, comprising an outlet cone carried by the exhaust casing, and wherein the shaft downstream journal is located in an inner space of the outlet cone.

5. The turbojet engine according to claim 4, wherein the reduction gear is located inside the inner space of the outlet cone.

6. The turbojet engine according to claim 1, wherein the low-pressure rotor is equipped with a radially-flexible element located between the rotor downstream journal and the reduction gear.

7. The turbojet engine according to claim 1, comprising a low-pressure compressor driven by the central shaft while being located between the fan and the high-pressure compressor.

8. The turbojet engine according to claim 1, wherein the reduction gear is an epicyclic reduction gear comprising:
   planets carried by a planet carrier which is carried by the central shaft;
   an inner crown which is carried by the low-pressure rotor;
   an outer crown which is carried by the exhaust casing;
   each planet meshing with the inner crown and the outer crown.

9. The turbojet engine according to claim 1, wherein the reduction gear is a planetary reduction gear comprising:
   planets carried by a planet carrier which is carried by the exhaust casing;
   an inner crown which is carried by the low-pressure rotor;
   an outer crown which is carried by the central shaft;
   each planet meshing with the inner crown and the outer crown.

10. The turbojet engine according to claim 1, wherein the inter-turbine casing comprises concentric outer shroud and inner shroud delimiting therebetween an annular space for passage of said flow, and further comprises a set of fixed radial blades each linking the outer shroud to the inner shroud and allowing de-twisting the flow.

* * * * *